US010319154B1

(12) United States Patent
Chakravarthula et al.

(10) Patent No.: US 10,319,154 B1
(45) Date of Patent: Jun. 11, 2019

(54) METHODS, SYSTEMS, AND COMPUTER READABLE MEDIA FOR DYNAMIC VISION CORRECTION FOR IN-FOCUS VIEWING OF REAL AND VIRTUAL OBJECTS

(71) Applicant: The University of North Carolina at Chapel Hill, Chapel Hill, NC (US)

(72) Inventors: Praneeth Kumar Chakravarthula, Chapel Hill, NC (US); Henry Fuchs, Chapel Hill, NC (US)

(73) Assignee: The University of North Carolina at Chapel Hill, Chapel Hill, NC (US)

( * ) Notice: Subject to any disclaimer, the term of this patent is extended or adjusted under 35 U.S.C. 154(b) by 0 days.

(21) Appl. No.: 16/041,650

(22) Filed: Jul. 20, 2018

(51) Int. Cl.
*G06T 19/20* (2011.01)
*G06T 19/00* (2011.01)
*G02B 27/01* (2006.01)
*G06F 3/01* (2006.01)

(52) U.S. Cl.
CPC .......... *G06T 19/20* (2013.01); *G02B 27/0172* (2013.01); *G06F 3/013* (2013.01); *G06T 19/006* (2013.01); *G06T 2200/04* (2013.01)

(58) Field of Classification Search
CPC ................................................ G02B 27/0172
See application file for complete search history.

(56) References Cited

U.S. PATENT DOCUMENTS

| 5,192,319 A * | 3/1993 | Worst | A61F 2/1602 |
| | | | 623/6.43 |
| 5,963,300 A * | 10/1999 | Horwitz | A61B 3/112 |
| | | | 351/209 |
| 6,712,467 B1 * | 3/2004 | Kitani | G02C 7/061 |
| | | | 351/159.42 |
| 2006/0092375 A1 * | 5/2006 | Menezes | G02C 7/028 |
| | | | 351/159.71 |
| 2008/0117289 A1 * | 5/2008 | Schowengerdt | G02B 26/005 |
| | | | 348/46 |

(Continued)

FOREIGN PATENT DOCUMENTS

WO    WO-2017120475 A1 * 7/2017 ............... G02B 3/14

OTHER PUBLICATIONS

Wikipedia, "Shack-Hartmann Wavefront Sensor," https://en.wikipedia.org/wiki/Shack%E2%80%93Hartmann_wavefront_sensor, pp. 1-2 (May 2017).

(Continued)

*Primary Examiner* — Jitesh Patel
(74) *Attorney, Agent, or Firm* — Jenkins, Wilson, Taylor & Hunt P.A.

(57) ABSTRACT

A system for providing auto-focus augmented reality (AR) viewing of real and virtual objects includes a frame for holding AR viewing components on a user's head and optically in front of the user's eyes. The AR viewing components include an internal virtual objects display for displaying virtual objects to a user. Internal and external focus correction modules respectively adjust focal distances of virtual and real objects, are respectively configurable to adjust the focal distances of the virtual and real objects differently based on the different user vision types, and operate to respectively adjust the focal distances of the virtual and real objects such that the virtual and real objects are simultaneously in focus based on the vision type of the user.

18 Claims, 9 Drawing Sheets

(56) References Cited

U.S. PATENT DOCUMENTS

| | | | | |
|---|---|---|---|---|
| 2011/0051079 | A1* | 3/2011 | Martinez | G02C 7/02 |
| | | | | 351/159.34 |
| 2012/0127062 | A1* | 5/2012 | Bar-Zeev | G02B 3/14 |
| | | | | 345/6 |
| 2012/0194781 | A1* | 8/2012 | Agurok | A61B 3/113 |
| | | | | 351/201 |
| 2013/0258486 | A1* | 10/2013 | Ionescu | G02B 27/0172 |
| | | | | 359/630 |
| 2013/0285885 | A1* | 10/2013 | Nowatzyk | G02B 3/0006 |
| | | | | 345/8 |
| 2016/0363770 | A1* | 12/2016 | Kim | G02B 27/0172 |
| 2017/0185037 | A1* | 6/2017 | Lee | G03H 1/2205 |
| 2017/0307890 | A1* | 10/2017 | Wang | G02C 7/022 |

OTHER PUBLICATIONS

Aggarwala et al., "Spectral Bandwidth and Ocular Accommodation," JOSA A, vol. 12, No. 3, pp. 450-455 (1995).

Akeley et al., "A Stereo Display Prototype with Multiple Focal Distances," In ACM Transactions on Graphics (TOG), vol. 23, pp. 804-813 (2004).

Aksit, et al., "Near-Eye Varifocal Augmented Reality Display Using See-Through Screens," ACM Transactions on Graphics (TOG), vol. 36, No. 6, pp 1:1-1:13 (2017).

Cholewiak et al., "Chromablur: Rendering Chromatic Eye Aberration Improves Accommodation and Realism," ACM Transactions on Graphics, vol. 36, No. 6, Article 210, pp. 210:1-210:12 (2017).

Dunn et al., "Wide Field of View Varifocal Near-Eye Display Using See-Through Deformable Membrane Mirrors," IEEE Transactions on Visualization and Computer Graphics, vol. 23, No. 4, pp. 1275-1284 (2017).

Fincham et al., "The Reciprocal Actions of Accommodation and Convergence," The Journal of Physiology, vol. 137, No. 3, pp. 488-508 (1957).

Fry, "Further Experiments on the Accommodation-Convergence Relationship," Optometry & Vision Science, vol. 16, No. 9, pp. 325-336 (1939).

Hasan et al., "Tunable-Focus Lens for Adaptive Eyeglasses," Optics Express, vol. 25, No. 2, pp. 1221-1233 (2017).

Hasan et al., "Large Aperture Tunable focus Liquid Lens Using Shape Memory Alloy Spring," Optics Express, vol. 24, No. 23, pp. 1-9 (2016).

Hoffman et al., "Vergence-Accommodation Conflicts Hinder Visual Performance and Cause Visual Fatigue," Journal of Vision, vol. 8, No. 3, pp. 1-30 (2008).

Hu et al., "High-Resolution Optial See-Through Multi-Focalplane Head-Mounted Display Using Freeform Optics," Optics Express, vol. 22, No. 11, pp. 1-8 (2014).

Hua et al., "A 3D Integral Imaging Optical See-Through Head-Mounted Display," Optics Express, vol. 22, No. 11, pp. 1-8 (2014).

Huang et al., "The Light Field Stereoscope: Immersive Computer Graphics Via Factored Near-Eye Light Field Displays with Focus Cues," ACM Transactions on Graphics (TOG), vol. 34, No. 4, pp. 1-12 (2015).

Huang et al., "Eyeglasses Free Display: Towards Correcting Visual Aberrations with Computational Light Field Displays," ACM Transactions on Graphics (TOG), vol. 33, No. 4, pp. 1-12 (2014).

Konrad et al., "Novel Optical Configurations for Virtual Reality: Evaluating User Preference and Performance with Focus-Tunable and Monovision Near-Eye Displays," In Proceedings on the 2016 CHI Conference on Human Factors in Computing Systems, pp. 1-10 (2016).

Konrad et al., "Accommodation-Invariant Computational Near-Eye Displays," ACM Transactions on Graphics (TOG), vol. 36, No. 4, pp. 88:1-88:12 (2017).

Koulieris et al., "Accommodation and Comfort in Head-Mounted Displays," ACM Transactions on Graphics, vol. 36, No. 4, pp. 1-12 (2017).

Kruger et al., "Chromatic Aberration and Ocular Focus: Fincham Revisited, Vision Research," vol. 33, No. 10, pp. 1397-1411 (1993).

Lambooij et al., "Visual Discomfort and Visual Fatigue of Stereoscopic Displays: A Review," Journal of Imaging Science and Technology, vol. 53, No. 3, pp. 030201:1-030201:14 (2009).

Lanman et al., "Near-Eye Light Field Displays," ACM Transactions on Graphics (TOG), vol. 32, No. 6, pp. 1-10 (2013).

Lin et al., "Electrically Tunable-Focusing and Polarizer Free Liquid Crystal Lenses for Ophthalmic Applications," Optics Express, vol. 21, No. 8, pp. 1-9 (2013).

Lombardo et al., "Wave Aberration of Human Eyes and New Descriptors of Image Optical Quality and Visual Performance," Journal of Cataract & Refractive Surgery, vol. 36, No. 2, pp. 313-331 (2010).

Maimone et al., "Computational Augmented Reality Eyeglasses," In Mixed and Augmented Reality (ISMAR), 2013 IEEE International Symposium on, pp. 1-10 (2013).

Maimone et al., "Holographic Near-Eye Displays for Virtual and Augmented Reality," ACM Transactions on Graphics (TOG), vol. 36, No. 4, pp. 85:1-85:16 (2017).

Maimone et al., "Pinlight Displays: Wide Field of View Augmented Reality Eyeglasses Using Defocused Point Light Sources," In ACM SIGGRAPH 2014 Emerging Technologies, pp. 1-2 (2014).

Matsuda et al., "Focal Surface Displays," ACM Transactions on Graphics (TOG), vol. 36, No. 4, pp. 1 (2017).

Orts-Escolano et al., "Holoportation: Virtual 3D Teleportation in Real-Time," In Proceedings of the 29th Annual Symposium on User Interface Software and Technology, USIT'16, pp. 741-754 (2016).

Padmanaban et al., "Optimizing Virtual Reality for All Users Through Gaze-Contingent and Adaptive Focus Displays," Proceedings of the National Academy of Sciences, pp. 1-6, (2017).

Schor, "A Dynamic Model of Cross-Coupling Between Accommodation and Convergence: Simulations of Step and Frequency Responses," Optometry & Vision Science, vol. 69, No. 4, pp. 258-269 (1992).

Lippmann, "Reversible Events Photos Integrals," Academic Accounts-Academic, pp. 1-4 (1908).

Percival, "The Relasion of Convergence to Accommodation and its Practical Bearing," Ophthal. Rev., vol. 11, pp. 1-17 (1892).

Sheard, "The Prescription of Prisms," American Journal of Optometry, vol. 11, No. 10, pp. 364-378 (1934).

Shi et al., "Near-Eye Light Field Holographic Rendering with Spherical Waves for Wide Field of View Interactive 3D Computer Graphics," ACM Transactions on Graphics (TOG), vol. 36, No. 6, pp. 1-17 (2017).

Shibata et al., "The Zone of Comfort: Predicting Visual Discomfort with Stereo Displays," Journal of Vision, vol. 11, No. 8, pp. 1-29 (2011).

Wei et al., "Electroactive Liquid Lens Driven by an Annular Membrane," Optics Letters, vol. 39, No. 5, pp. 1318-1321 (2014).

Wei et al., "Focus-Tunable Liquid Lens with an Aspherical Membrane for Improved Central and Peripheral Resolutions at High Diopters," Optics Express, vol. 24, No. 4, pp. 1-1-1 (2016).

* cited by examiner

METHODS, SYSTEMS, AND COMPUTER READABLE MEDIA FOR DYNAMIC VISION CORRECTION FOR IN-FOCUS VIEWING OF REAL AND VIRTUAL OBJECTS

TECHNICAL FIELD

The subject matter described herein relates to viewing real and virtual objects using augmented reality viewing systems. More particularly, the subject matter described herein relates to dynamic vision correction for in-focus viewing of real and virtual objects.

BACKGROUND

Augmented reality (AR) viewing systems provide a display for displaying virtual objects to a user and also allow the user to view real world objects. One example of an augmented reality viewing system is a head mounted display where a display positioned near the user's eyes displays virtual objects to the user, and the user is provided an optical path for viewing real world objects located external to the head mounted display.

Some AR viewing systems are designed to display virtual images such that the images are in focus at a depth corresponding to a depth of the vergence plane of the user's eyes. However, such systems do not account for users with different visual impairments, especially differences in accommodation capabilities of users.

Accommodation capability is the ability of a user to bring images into sharp focus. Accommodation capability is a function of the physiology of the user's eyes, including flexibility of the lens. Users with presbyopic vision may only be capable of focusing at a single depth or a narrow range of depths. Users with myopic vision may only be capable of focusing on near objects, and users with hyperopic vision may only be capable of focusing on far objects. Current AR systems without vision correction can degrade the user's experience because real and virtual object will only appear in focus for users without visual impairments.

Accordingly, there exists a need for improved AR systems that account for users with different visual impairments.

SUMMARY

A system for providing auto-focus augmented reality (AR) viewing of real and virtual objects includes a frame for holding AR viewing components on a user's head and optically in front of the user's eyes. The AR viewing components include an internal virtual objects display for displaying virtual objects to a user. Internal and external focus correction modules respectively adjust focal distances of virtual and real objects, are respectively configurable to adjust the focal distances of the virtual and real objects differently based on the different user vision types, and operate to respectively adjust the focal distances of the virtual and real objects such that the virtual and real objects are simultaneously in focus based on the vision type of the user.

A method for providing auto-focus augmented reality viewing of real and virtual objects includes displaying virtual objects to a user on an internal display mounted to a frame for holding augmented reality viewing components on a user's head and optically in front of the user's eyes. The method further includes adjusting, using an internal focus correction module that is configurable to adjust the focal distance of the virtual objects differently for different user vision types, a focal distance of at which the virtual objects are displayed to a user based on a vision type of the user. The method further includes adjusting, using an external focus correction module that is configurable to adjust the focal distance of the real object based on the different user vision types, a focal distance of real objects based on the vision type of the user. The internal and external focus correction modules operate to respectively adjust the focal distances of the virtual and real objects such that the virtual and real objects are simultaneously in focus based on the vision type of the user.

The subject matter described herein may be implemented in hardware, software, firmware, or any combination thereof. As such, the terms "function" or "module" as used herein refer to hardware, software, and/or firmware for implementing the feature being described. In one exemplary implementation, the subject matter described herein may be implemented using a computer readable medium having stored thereon computer executable instructions that when executed by the processor of a computer control the computer to perform steps. Exemplary computer readable media suitable for implementing the subject matter described herein include non-transitory computer-readable media, such as disk memory devices, chip memory devices, programmable logic devices, and application specific integrated circuits. In addition, a computer readable medium that implements the subject matter described herein may be located on a single device or computing platform or may be distributed across multiple devices or computing platforms.

DETAILED DESCRIPTION

Introduction to VR and AR:

Enhancing Virtual Reality (VR) has been identified by the National Academy of Engineering (NAE) as one of the fourteen grand challenges for engineering in the 21$^{st}$ century, along with challenges such as "reverse engineer the brain", "provide energy from fusion", and "secure cyberspace". Augmented Reality (AR) is the form of VR in which users see the synthetic "virtual world" imagery overlaid and merged with their real-world surroundings. Many experts predict that VR, and especially AR, will be the next mass market platform taking the place of PCs, laptops, and mobile phones.

Vision of AR:

If AR is indeed to be the next platform, then AR systems will have to be comfortable enough to be worn for long periods, perhaps all day, like a pair of ordinary eyeglasses. Otherwise people will just continue to carry their smartphones in their pockets. If AR does become like one's everyday prescription eyeglasses, then it will be used for both 2D content (messages, reminders) and 3D geolocated content (directions to restaurants, virtual/remote participants walking around the room with local people; e.g. holoportation [29]). In all these situations, the user wants to have a comfortable view, simultaneously, of both real and virtual worlds.

Many design and computational challenges have to be overcome for such eyeglass-style AR systems to become a reality: low latency tracking and rendering, low power, a display with wide field of view in a compact form factor. The concentration of this disclosure is on a crucial, under-investigated aspect of AR systems: focal accommodation for real and augmented imagery.

Importance of Focus Cues in VR:

The distance to which the eyes must converge for both to fixate upon the same point in space is called the vergence distance, and the distance to which the eyes must accommodate to bring the image of that point in space to sharp focus is the focal or accommodation distance. Vergence and accommodation are neurally coupled, i.e. as the vergence angle changes, the eye adjusts its accommodation depth, thus bringing the scene into focus. Proper matching between vergence and accommodation are important in VR. If not matched, then the conflict of vergence distance and accommodation depth, called the vergence-accommodation conflict (VAC), causes fatigue and discomfort [11, 20, 36].

Importance of Focus Cues in AR:

Proper matching between vergence distance and accommodation depth is even more important in AR than VR because in addition to the requirements of VR, in AR the real world has to be closely matched to the virtual world. If the virtual images co-located with real world objects are not at the same focal depth, the disparity in blur forces the user to change focus upon gazing at objects that should be completely sharp (see FIG. 1).

Figure 1:
FIG. 1 (left) is an image of a real guide book, a real scene, and virtual objects that are out of focus because they are located at a the same fixed depth plane, which is different from the plane on which the user's eyes are currently focused, FIG. 1 (right) is an image where the virtual objects are in focus but the guide book is out of focus.

In FIG. 1, the left hand image is an image of a real guide book, a real scene (a street scape), and virtual objects (graphical tags describing real objects) that are out of focus because they are located at the same fixed depth plane, which is different from the plane on which the user's eyes are currently focused. The mismatch of virtual and real world focus cues in AR for existing conventional AR displays is due to all virtual objects placed at a fixed depth plane. In the left image in FIG. 1, since the virtual images are placed at a farther depth plane than the guide book, the book appears in focus and the virtual image tags on the book are out of focus. In the right hand image in FIG. 1, the virtual image tags on the book appear sharp when focused at a farther depth, but now the book is out of focus.

VAC with Prescription Eyeglasses and Adaptation:

For users who need corrective lenses in their everyday lives ("near-sighted", "far-sighted"), the situation is even more complex, because these users already have to deal with VAC even without AR or VR [36]. Consider a "near-sighted" user who can comfortably verge and accommodate to, say, 0.5 meters, but needs corrective lenses to focus clearly at objects at 10 meters. When he first uses the corrective "distance" lenses, an object at 10 meters appears in focus (because to his eyes, it is at 0.5 meters), but he will verge to 0.5 meters, giving him "double vision." Only after many hours, days or even weeks of wear, does his vision system gradually adapt to verging at 10 meters while still accommodating to 0.5 meters. Some users never become adapted to such a large VAC. Over generations, opticians have empirically studied the range of VACs ("zone of clear single binocular vision", "zones of comfort" [5, 8]) which are tolerable and to which most users can adapt.

Vision Correction for Presbyopes and AR:

When donning a head mounted display (HMD), users requiring vision correction still need to wear their corrective lenses. A few AR displays, such as Lumus DK-32, provide physical space between the user's eyes and the display, for fitting prescription lenses. For presbyopes (people over 40 years of age), who account for about 40% of US population, this does not solve the problem because the user's range of focus is restricted by the focus range of the lenses being worn at any moment—for instance "reading" glasses or "driving" glasses. Installing bifocals, trifocals, or progressive lenses merely puts a particular distance in focus at one vertical angle, forcing the user to tilt their head up or down to bring in focus a real-world object that is at a particular distance. Inventors since at least Benjamin Franklin have tried to solve the problem of getting objects at all distances to be in focus, but even the most recent offerings require the user to turn a focus knob on the lens (e.g. Alvarez lens) to adjust the depth of the focal plane—an unacceptably awkward requirement for most users.

Figure 2:
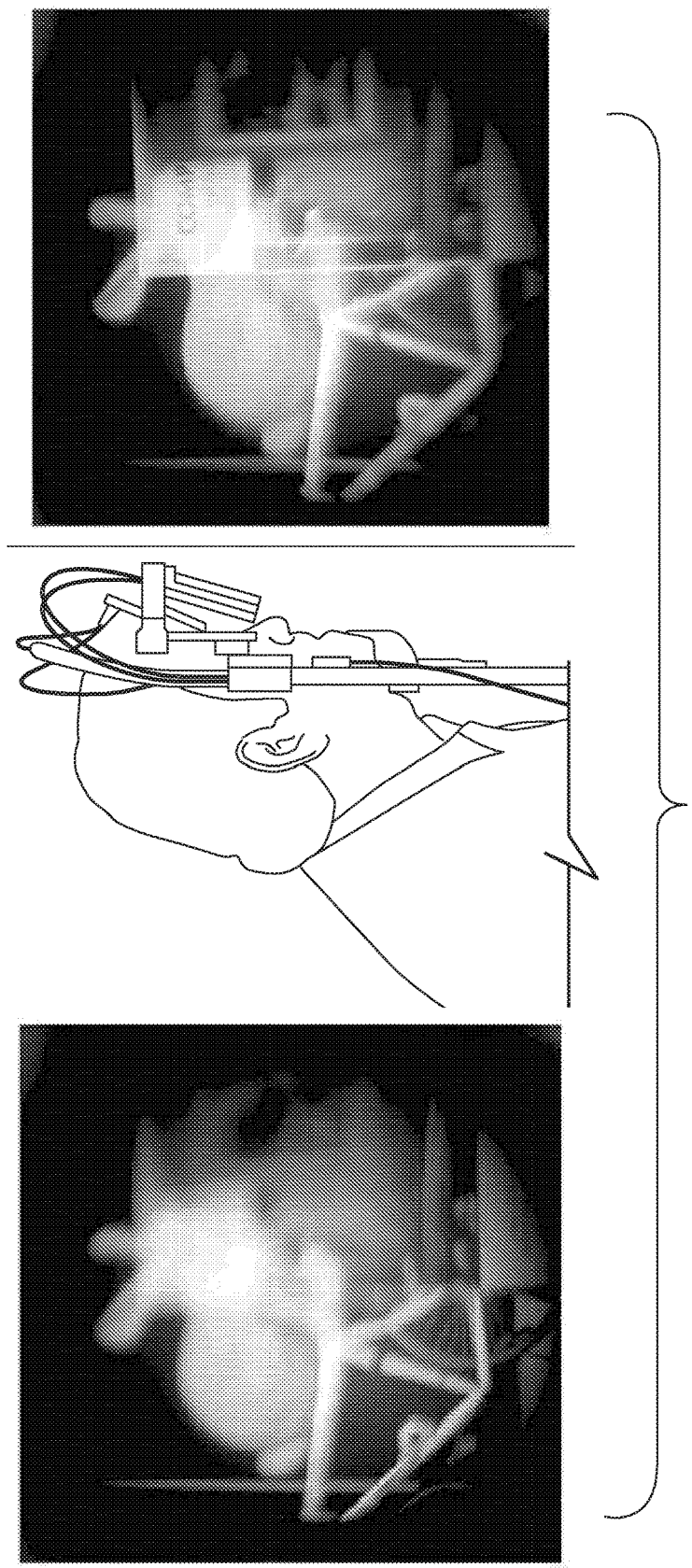
FIG. 2 (left) is an image of real and virtual objects viewed by a simulated presbyopic user, FIG. 2 (middle) is an image of a presbyopic user looking through a prototype AR display with dynamic vision correction, and FIG. 2 (right) is an image of simulated in-focus viewing of real and virtual objects using dynamic vision correction as described herein.

FIG. 2 (Left) is an image illustrating the view of both real and virtual objects for a simulated presbyopic user with distant vision. In FIG. 2, the real objects are the textbook, the stamp, and the bicycle, and the virtual object is the bunny. The accommodation depth for the simulated presbyopic is set to 7 m on a conventional AR HMD without vision correction. The virtual bunny is located at a mid-distance (1 m) together with the stamp, text book and bicycle arranged at near (0.25 m), medium (1 m) and far (5 m) distances respectively. Both the real and virtual imagery appears blurred to the user as none of the objects are in the presbyopic user's accommodation plane.

The middle image in FIG. 2 illustrates presbyopic user with near zero accommodation range looking through a prototype implementation auto-focus AR eyeglasses with dynamic vision correction for users with different vision impairments. Our prototype AR eyeglasses are capable of providing well-focused imagery of both real and virtual objects at all depths by independently adjusting for the user focus for viewing both real world and virtual imagery from the internal display, based on the user's current eye accommodation state.

The right image in FIG. 2 illustrates a well-focused view of both real and virtual objects of the same scene on our auto-focus AR eyeglasses, due to independent focus adjustments for both real and virtual. Notice that the letters on the textbook at the mid-distance (1 m) are in sharp focus, as well as the virtual bunny, which also is set to appear at the mid-distance.

New Opportunity with AR Displays:

Today's and future AR displays offer an opportunity to ameliorate vergence-accommodation conflict by taking advantage of the capabilities already on AR displays: powerful processors and outward looking depth sensing for tracking and hand-based user interaction (e.g. Hololens, Meta). If rapid, accurate, and robust binocular eye tracking were added, a system could measure the user's object of attention in both the real and virtual world. Then adaptive focus could be added to the real world (external) view and separate adaptive focus for the virtual world (internal) view to bring into focus both real and virtual. Such a display could also operate as auto-focus prescription eyeglasses, with the virtual content turned off.

Current Challenges for Auto-Focus AR Glasses:

Building an AR display that presents well-focused images, both real and virtual, and near and far, requires overcoming two major challenges:

1. Designing a display that can dynamically adjust focus for both the internal display (showing rendered synthetic content) and the external real world scene. We address this problem by using tunable-focus lenses for external scene and a varifocal beam combiner design for the internal display.
2. Robust eye tracking to determine the user's current gaze fixation. Note that we do not implement eye tracking in our current version of the prototype.

1.1 Contributions

One aspect of the subject matter described herein is that an augmented reality display needs to have the capability of dynamically supporting appropriate focus cues not only for the virtual content but also for viewing the real world, in order to cater to larger audience. Future AR displays are targeting an eyeglasses form factor and providing for on-board computation integrating several outward looking sensors. With an auto-focus capability for both real and virtual, the AR eyeglasses could potentially replace conventional user prescription eyeglasses. Specific contributions of our work are as follows:

1. We present a framework for analyzing the retinal blur caused by AR displays, both for real and virtual objects out of focus. We use this to understand and characterize the requirements for AR displays to present well-focused real and virtual imagery.
2. We propose to design and fabricate a prototype of auto-focus AR eyeglasses from 3D printed components as well as off-the-shelf consumer electronics, and drive the display in real-time.
3. We demonstrate that with independently adjustable focus, for viewing both real world as well as virtual content, perceived image quality improves for users with lower order aberrations in eye along with those with normal vision across all depths. Note that astigmatism is not corrected in the current version of the prototype.

2 Background and Related Work 2.1 Zone of Comfort

We propose to correct for the user's vision for the real world as well as the virtual world. Of all correctable visual imperfections, refractive errors are the most common[5] and most pertinent to AR displays. Correcting such errors for viewing both digital and real content is of primary concern.

As discussed in section 1, all corrective prescription lenses introduce a certain amount of VAC. People have known for a long time that there is a zone of clear single binocular vision and zones of comfort for tolerable VAC. [5, 8] Percival [31] and Sheard [34] proposed that the spectacle prescriptions should utilize prisms and lenses to place natural stimuli inside the zone of comfort and thus mitigating VAC in prescription glasses. However, people adapt to this VAC over time, with most people taking a couple of weeks to get used to the new prescription. It is to be noted that presbyopes with corrective lenses adapt to two or more different corrective lens powers simultaneously. This gives us more confidence that people will be comfortable with dynamic focus.

2.2 Adjustable-Focus Lenses

An AR HMD that dynamically adjusts for user accommodation state, both for real and virtual content, requires optical elements that are tunable in focus. Here we review designs of adjustable-focus lenses and investigate their characteristics.

Lin and Chen [22] proposed electrically focus-tunable, polarizer-free, liquid crystal lenses for ophthalmic applications. By varying the applied voltage, a range of positive and negative focal lengths were achieved. Wei et al. [37] proposed an electroactive liquid lens design which is driven by an annular membrane, but suffered from a limited aperture size. A large aperture focus tunable liquid lens was achieved by changing the curvature of the lens using shape memory alloy spring by Hasan et al. [10]. Wei et al. [38] designed an electrically tunable liquid lens with an aspheric membrane and improved central and peripheral resolutions at high diopters. These designs, with spherical curvatures, suffer spherical aberrations along with gravity induced coma, which is common for all liquid lenses. Hasan et al. [9] proposed a piezo-actuated piston based mechanically tunable liquid lens, which can control coma aberration but compromises on the maximum achievable optical power of the lens. A range of tunable liquid lenses are also commercially available[7]. An adaptive, focus-tunable lens for vision correction in AR needs to eliminate spherical, chromatic, comatic and other aberrations present in existing optical designs. Though current commercially available tunable-focus lenses have limited aperture sizes, the developments as mentioned here promise wide aperture tunable-focus lenses that could be used for prescription correction in near future.

2.3 Vergence Accommodation Conflict (VAC)

Vergence and accommodation are neurally coupled. [7, 33] This neural coupling is useful in the real world since vergence distance and accommodation distance are almost always equal. Several experimental studies have attempted to more fully understand the effects of VAC on viewing stereoscopic content in VR. Padmanaban et al. [30] evaluated the user comfort by changing the display focal state using focus tunable lenses based on the eye accommodation state measured by an autorefractor device. An accommodation invariant display design was used by Konrad et al. [17], making the imagery appear always in focus while supporting vergence to mitigate VAC to an extent. Koulieris et al. [18] evaluated the feasibility of several existing designs for alleviating VAC and found that the most effective way to eliminate VAC is driving accommodation by getting focus cues correct or nearly correct. The study also showed that other proposed solutions like DoF rendering and monovision do not drive accommodation accurately and therefore do not minimize VAC in VR as much as one would hope.

Advantages of mitigating VAC in virtual reality displays can be heavily user dependent—for example, users with focal imperfections might not see a significant advantage as compared to users with normal vision [30]. The effects of VAC on AR have not, to our knowledge, been reported in the literature. AR poses additional challenges because the physical world is in view, and so the rendered synthetic content should match the depth of physical world.

2.4 Focus Supporting Near-Eye Displays

Light Field and Holographic Displays:

Light field and/or holographic displays are ideal, as they support (at least conceptually) all focus cues, statically, for all states of user accommodation, (i.e. the user can focus at any depth at any time) but all have serious shortcomings.

Lanman and Luebke [21] demonstrated a VR near-eye light field display (NELD) design, extending on the concepts of integral imaging first introduced by Lippmann [23]. Unfortunately, the perceived resolution of the imagery is an order of magnitude lower than the original display. Maimone and Fuchs [25] used a stack of LCDs to present time multiplexed attenuation patterns to generate a light field at the eye. Huang et al. [14] demonstrated a similar factorized compressive lightfield display built on conventional VR near eye display (NED) design. A freeform see-through NED based on integral imaging method was proposed by Hua and Javidi [13] which supported lightfields in a limited FoV (33.4°). Maimone et al. [27] introduced and demonstrated a very wide FoV (110° diagonal) see-through NED, but lack of eye-tracking limited the effective resolution and the available LCD components degraded the image quality with diffraction effects. More recent designs by Maimone et al. [26] and Shi et al. [35] use holography with fine depth control and high image quality with a wide FoV, but have shortcomings with respect to eyebox size and required computation.

Multifocal and Varifocal Displays

The lack of any fully useful design of light field or holographic displays has encouraged researchers to explore other designs based on multi-focal or variablefocal ideas—either multiple depth planes displayed simultaneously or a single depth plane moved dynamically in depth with a computational blur (e.g. including chromatic aberration ocular blur [1, 4, 19]) approximation of items away from the current depth.

Akeley et al. used multiple display planes to generate approximate focus cues, without eye tracking, on a large format display. Hu et al. [12] extended the idea of multiplane desktop displays to near-eye displays by demonstrating a freeform optical design supporting high resolution imagery. Recent work of Matsuda et al. [28] demonstrate the idea of deforming a plane to non-planar surface to nearly match the scene depth in VR, thereby generating more correct focus cues, unfortunately with low frame rate (46 sec per frame) and limited color. The above designs have a small FoV and are currently bulky. Recently Dunn et al. [6] demonstrated a varifocal display with a wider FoV (100° diagonal) using deformable beamsplitters, whereas Aksit et al. [3] used see-through holographic diffuser screens to achieve a similar varifocal capability with wide FoV.

Other techniques like monovision and use of focus tunable lenses [16] have also been proposed for mitigating VAC in VR NEDs. Huang et al. [15] demonstrated that correction for refractive errors can be encoded into a light field display by predistorting the image presented, eliminating the need to wear glasses. But none of the existing display designs actively correct for the imperfections in the vision of the users for viewing real world and no one, to the best of our knowledge, has addressed the challenge of providing correct focus cues for both real and virtual scenes simultaneously.

3 Focus AR Architecture

In this section we present a framework for describing the requirements of auto-focus in augmented reality eye glasses. The mathematical model helps us to calculate the best possible configuration for presenting well-focused imagery for both real and virtual in an augmented reality display. Section 3.1 presents an in-eye image formation model and discusses the circle of confusion on the retinal plane, which is directly related to the visual acuity [24, 32]. Section 3.2 discusses image formation for users with normal vision as well as users with refractive errors in an AR setting, with the limitations of conventional AR head-mounted displays (HMDs). Section 4 explores the design requirements for the internal display to present correct virtual imagery and the external vision correction to correct the real world for an auto-focus AR display for all users.

Note:

The display contained in the HMD and used for displaying generated virtual imagery is referred to as the internal display, the virtual image plane formed on the internal display is referred to as the virtual image plane, and the real world outside the HMD is referred to as the external view henceforth.

3.1 Focused Image Formation of Real World Objects

It is common knowledge that the eyes can focus at various distances by changing the shape of its lens, thereby changing the effective focal distance. This process of changing the focal power to bring objects into focus on the retina is called accommodation. However, one must note that the eye lens (crystalline lens) is not an ideal lens, but has (many) associated aberrations [24]. Real lenses like that of the eye do not focus all rays precisely to one point. Therefore, even at best focus, a point is imaged as a spot on the image plane, which is called a circle of confusion (CoC).

In the human eye, with the cornea and crystalline lens acting together as lens and retina as image plane, the CoC is the spot a real world point makes on the retina. For a given point source distance and the focal state of the eye, the diameter of the blur spot formed in the retinal plane can be calculated from the principles of similar triangles.

Figure 3:
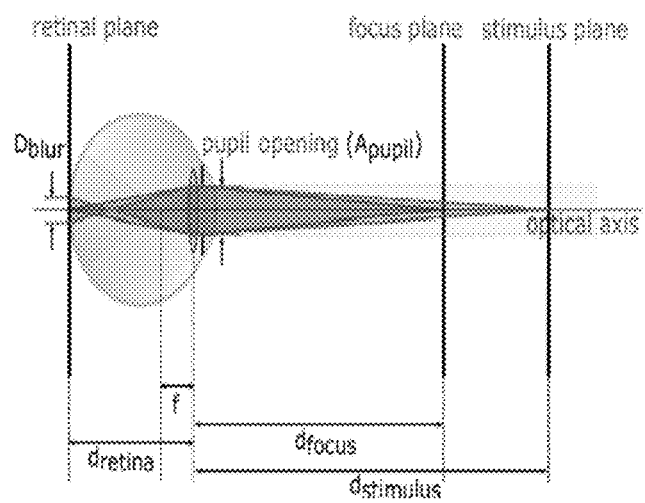
FIG. 3 illustrates a model of focused image formation on the retinal plane of the eye.

FIG. 3 illustrates a simple model of focused image formation on the retinal plane of the eye. For a given lens focal state and the size of the pupil opening, an object present outside of the focus plane causes a defocus blur on the retina. The size of this blur circle can be used to analyze the sharpness of the image formed on the retina, and this model can be used to understand and characterize the requirements of well-focused real and virtual imagery in an AR display.

As shown in the FIG. 3, consider a situation where an eye brings into focus a point source located at a distance $d_{focus}$ from the crystalline lens on the retinal plane located at a distance $d_{retina}$. Let us suppose that the focal length of the eye lens for the above configuration is f. Since the eye is focused at a distance $d_{focus}$, another point source located at $d_{stimulus}$ will appear out of focus and is imaged on the retinal plane as a blur circle of diameter $D_{blur}$.

The defocus disk or the blur circle on the retinal plane can be thought of as the image formed by the crystalline lens, of projection of the cone of light from the point source at distance $d_{stimulus}$ on the focus plane located at $d_{focus}$. For a pupil opening of size $A_{pupil}$, the diameter $D_{proj}$ of projection of the point source in the stimulus plane onto the focus plane can be calculated using similar triangles as $$D_{proj} = A_{pupil} \frac{|d_{stimulus} - d_{focus}|}{d_{stimulus}} \quad (1)$$

From geometric optics, it is known that the size of the image on the image plane is equal to the object size multiplied by magnification of the system, so the size of blur circle $D_{blur}$ on the image plane is given by $$D_{blur} = D_{proj} m \qquad (2)$$

where the magnification m of the given system can be obtained as $$m = \frac{d_{retina}}{d_{focus}} \qquad (3)$$

Although the distance to the retina from the crystalline lens plays a pivotal role in determining the blur circle, as can be seen from the above equation, since the distance $d_{retina}$, can be assumed to be constant for all accommodation states of the eye, the magnification of the system can be derived from the lens equation as $$\frac{1}{f} = \frac{1}{d_{focus}} + \frac{1}{d_{retina}} \qquad (4)$$

$$d_{retina} = \frac{fd_{focus}}{d_{focus} - f} \qquad (5)$$

$$m = \frac{f}{d_{focus} - f} \qquad (6)$$

which depends on $d_{focus}$ and f, two important parameters that are to be considered for designing an AR display. However, note that for a real world object, changing f automatically results in a change in $d_{focus}$. Substituting equation 6 in equation 2 gives the resultant diameter of the defocus disc as $$D_{blur} = A_{pupil} \frac{|d_{stimulus} - d_{focus}|}{d_{stimulus}} \left( \frac{f}{d_{focus} - f} \right) \qquad (7)$$

Notice that the blur circle depends on the focus plane, stimulus object plane, pupil opening and the current eye lens accommodation state (or the current focal length of the crystalline lens). For the stimulus to appear in sharp focus, the circle of confusion needs to be minimized on the retinal plane. We can define a maximum CoC which is the largest defocus spot that is indistinguishable from a point for a human eye when imaging a point source, as the point threshold. If the point threshold is c, then the images formed on the retinal plane are considered to be in sharp focus if $$D_{blur} \leq c \qquad (8)$$

The range of distances $d_{stimulus}$ that satisfy the equation 8 define the Depth of Field (DoF) of the human eye for the focus plane at $d_{focus}$, within which the images formed on the retina are in focus. Observe that the DoF depends on three factors: the current focal state of the crystalline lens, distance to the plane of focus of the eye and the size of the pupil opening.

For objects to be well-focused on the retinal plane, from equation 8, there are two possibilities:

The size of the pupil opening is small enough such that equation 8 is satisfied for all depth ranges. Unfortunately, the size of the pupil varies heavily depending on the ambient light and several other physiological factors causing a varied depth of field effect for a given eye lens power. An external, artificial pinhole aperture model can be employed, which has nearly infinite depth of field and hence everything appears in focus, but having a small aperture limits the incoming light causing the image formed on the retina to be very dim and thus is not practical.

A continuously varying focal length f, and hence the location of the plane of focus $d_{focus}$, such that any stimulus located at $d_{stimulus}$ causes an acceptable blur disk, resulting in well-focused images. Notice that this ability of eye to change the shape of its lens results in dynamic focus adjustments and a continuously variable focal length, bringing a range of depths into sharp focus.

3.2 Image Formation in AR for Different User Groups

We have discussed the blur circle on the retinal plane and the circle of least confusion which is used to determine if the images formed on the retina are in sharp focus. Now we review the conventional AR HMD and its limitations, and build towards a more practical AR HMD design.

Conventional AR HMDs place an augmented view over a real world view by using simple optics (e.g. beam splitter) reflecting an internal display (e.g. liquid crystal display (LCD)) worn on the forehead (e.g. Meta 2). More advanced designs use complex optics such as waveguides to optically place the virtual image at a distance from the eye, like Microsoft Hololens. In either case, notice that the augmented virtual image is placed at a fixed distance from the eye, similar to that of a conventional VR HMD.

We will now define two types of blur disks to independently analyze the images formed by the real world objects and the augmented images formed by the internal display. The "Real World Blur" ($D_{blur;real}$) is the blur caused by an external real object when the user's eyes are fixated to the virtual image shown on the internal display, and is defined as $$D_{blur;real} = A_{pupil} \frac{|d_{stimulus;real} - d_{focus;virtual}|}{d_{stimulus;real}} \left( \frac{f}{d_{focus;virtual} - f} \right) \qquad (9)$$

where $d_{stimulus;real}$ is the real object distance from the eye and $d_{focus;virtual}$ is the distance to the virtual image plane which the user focus is set to. For the real world object to appear sharp when the user is fixated on the virtual image, $$D_{blur;real} \leq c \qquad (10)$$

The blur seen on the internal display when the user is fixated on a real world target is hereby called the "Virtual Image Blur" $D_{blur;virtual}$ and is defined as $$D_{blur;virtual} = A_{pupil} \frac{|d_{stimulus;virtual} - d_{focus;real}|}{d_{stimulus;virtual}} \left( \frac{f}{d_{focus;real} - f} \right) \qquad (11)$$

where $d_{stimulus;virtual}$ is the distance at which the augmented virtual image appears, whereas $d_{focus;real}$ is the distance to the real world object to which the user's focus is set. For the virtual image to appear sharp when the user is focused to a certain real world target at $d_{focus};real$, the virtual image blur should be such that $$D_{blur;virtual} \leq c \qquad (12)$$

When the user fixates on the virtual imagery displayed by the internal display, the focus plane of their eye is set to the depth of the virtual image, i.e.

$$d_{focus;virtual} = d_{virtual\ image}$$

This means that for a given maximum circle of confusion size c which is still perceivable as a single point for the eye, there is only a small range of real world stimuli distances $d_{stimulus;real}$; real that satisfy equation 10, resulting in well-focused real world images. As one

TABLE 1

Comparison of focus adjustment requirements for different users for viewing well focused imagery of both real and virtual objects at all distances.

| User Vision Type | External Real World Connection | Internal AR Display Correction |
|---|---|---|
| Normal-Vision | No Correction | Dynamic |
| Myopic ('near-sighted') | Static | Dynamic (offset by prescription) |
| Hyperopic ('far-sighted') | Static | Dynamic (offset by prescription) |
| Presbyopic ('limited accommodation') | Dynamic | Static | might guess, changing the focus to a real world object at $d_{stimulus}$, i.e.

$$d_{focus;real} = d_{stimulus}$$

would increase the virtual image blur $D_{blur;virtual}$; virtual (the blur spot resulting from the internal display) making the virtual image appear out of focus, which is indeed not intended. Moreover, users with refractive errors would not be able to see either one or both of virtual and real imagery without their prescription lenses. Though this is not a big problem for Myopic and Hyperopic users given that AR eyeglasses can have slots to slide in prescription lenses, the real issue arises for Presbyopic users since the use of bifocals or progressive lenses limit the effective field of view per depth range as shown in FIG. 4.

Figure 4:
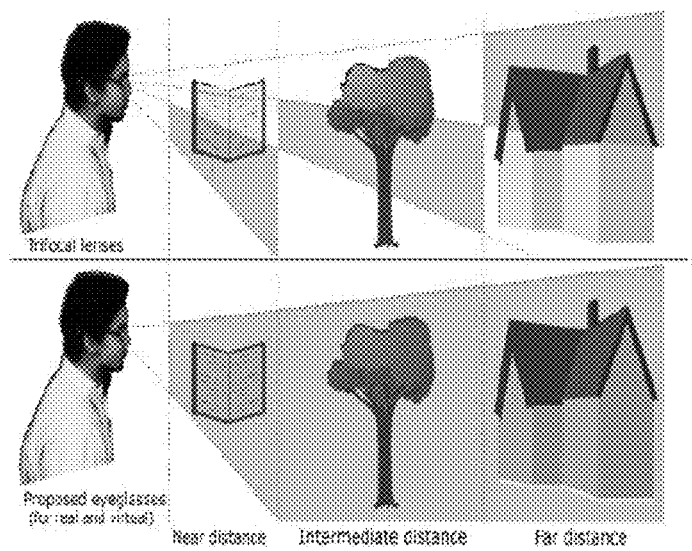
FIG. 4 illustrates a field of view comparison between trifocal glasses (top) and an auto-focus AR HMD (bottom)

FIG. 4 illustrates a field of view comparison between trifocal glasses (top) and an auto-focus AR HMD (bottom). In the top portion of FIG. 4, a presbyopic person wearing trifocals needs to tilt his or her head to look through the correct segment of the lens, to bring a range of distances into focus within a part of the total field of view. On the other hand, as illustrated by the bottom view in FIG. 4, auto-focus AR eyeglasses dynamically adjust for the user's vision providing well-focused imagery of both real and virtual objects, across the entire field of view.

3.2.1 Users with Normal Vision

People with normal vision can accommodate a wide range of distances, meaning that the crystalline lens of their eyes can have a continuously varying focal length. Therefore, it can be observed from equations 7 and 8 that much of the target depths can be brought into sharp focus, i.e. $D_{blur} \leq c$ for a wide range of real world stimuli. However, for a given virtual image plane, the range of real world object distances, $D_{stimulus;real}$, that satisfy equation 10 is limited, meaning that not all real world objects can appear in focus simultaneously with the virtual imagery. To have both real and virtual in focus simultaneously, from Equations 9 and 11, the distance at which the virtual image appears (or simply, the virtual image focus) needs to change on demand when the user accommodates to various distances in the real world.

3.2.2 Users with Myopia or Hyperopia

Myopic or Hyperopic people experience a lens power offset from the normal range. Being unable to focus at far distances in the former case and near distances in the latter, they experience a shifted accommodation range. From equation 7, if a fixed term equal to their prescription is added to the range of values the focus of the crystalline lens f, it can be observed that not all real world depths can appear in sharp focus. The standard method of correcting for myopia or hyperopia is by using fixed negative and positive dioptric power prescription lenses respectively, thereby optically shifting the object of interest by a distance corresponding to the corrective lens power. However, in an AR setting, both real world blur and virtual image blur sizes need to be below the point threshold for both real and virtual to appear in focus simultaneously. Therefore, the power of the corneal-crystalline lens system needs to be corrected as $$P_{corrected} = P_{eyelens} + P_{prescription} \quad (13)$$

such that $D_{blur} \leq c$ for $$f = \frac{1}{P_{corrected}},$$

bringing the real world object into focus.

Replacing f with $f_{corrected}$ in equation 11 yields $$D_{blur;virtual} = A_{pupil} \frac{|d_{stimulus;virtual} - d_{focus;real}|}{d_{stimulus;virtual}} \left( \frac{f_{corrected}}{d_{focus;real} - f_{corrected}} \right) \quad (14)$$

As can be clearly seen from the above equation 14, for the given $f_{corrected}$ value the virtual image distance $d_{stimulus;virtual}$ needs to be adjusted such that $D_{blur;virtual} \leq c$ for a well-focused virtual image. Therefore, it is necessary that the focus is corrected for both real and virtual imagery, i.e. correcting for the offset eye focus range and then placing the virtual imagery at the new corrected optical depth for the eye. Similarly, it is to be observed that one can also place the virtual image at the same physical depth as the real world object, and correct the eye focus once for both. Choosing one of the above two approaches is largely a design choice for the AR display.

3.2.3 Users with Presbyopia

Presbyopia is the refractive error caused by losing the plasticity of the crystalline lens, typically associated with aging of the eye. Due to the hardening of the lens, the eye loses its ability to change its shape resulting in a nearly fixed focus plane, i.e. $f = f_{fixed}$ (Note that some accommodation is retained in a presbyopic eye, in reserves). Similar to the focus correction as mentioned in section 3.2.2, presbyopia can be corrected with prescription lenses. However, unlike the case with myopia or hyperopia where some plasticity of the eye lens still remains, presbyopic users need different prescription correction for various depth ranges. Hence they generally choose multifocal lenses or progressive lenses, or sometimes employ monovision solutions.

We want to point that the multifocals or progressive lenses offer a small field of view (FoV) for near and far segments of the lens, and require the user to tilt their head to bring the gaze into the right segment to focus on an object. For an augmented reality HMD, a small FoV and constant head tilt is not something that is desired. With a fixed eye focus, the blur equation for a presbyopic eye is as follows $$D_{blur} = A_{pupil} \frac{|d_{stimulus} - d_{focus;fixed}|}{d_{stimulus}} \left( \frac{f_{corrected}}{d_{focus;fixed} - f_{corrected}} \right) \quad (15)$$

where $f_{corrected}$ is similar to equation 13. But notice that in case of myopia or hyperopia, since significant accommodation is left in eye, a static focus correction for external view is sufficient. In case of presbyopia, since the accommodation is nearly fixed, the correction needs to be dynamic for well-focused real world images, i.e. $D_{blur} \le c$.

On the other hand, the virtual image blur can be computed as $$D_{blur;virtual} = A_{pupil} \frac{|d_{stimulus;virtual} - d_{focus;fixed}|}{d_{stimulus;virtual}} \left( \frac{f_{fixed}}{d_{focus;fixed} - f_{fixed}} \right) \quad (16)$$

Observe that since the focus of the eye and hence the focus plane $d_{focus}$ is fixed, it is sufficient to display the virtual imagery at the fixed focal plane of the eye for a perfectly in-focus virtual image for a presbyopic user. One could also place all virtual imagery at the real world object depth and correct for both real and virtual at once. But this approach would only result in an extra complexity in driving the focus of the internal display, which can be avoided.

In this section we have seen the various focus adjustment requirements for users with and without any refractive errors for seeing well-focused imagery, both real and virtual, in an AR display. These insights are summarized in table 1.

4 Focusar Display Design

From Table 1 it can be seen that for an AR display to support focus cues for both real and virtual, we need independent adjustments for the virtual image depth and the real world vision correction. In this section we discuss our design choices for external dynamic prescription correction and focus supporting internal display.

Vision Correction for Real World

We have seen that while users with normal vision do not need any vision correction, users with any refractive aberrations in eye need external focus adjustments to bring real world objects into sharp focus. However, myopic and hyperopic users only need a static focus correction whereas presbyopic users need dynamic vision correction based on the depth of the object of interest. Therefore, for dynamically adjusting the external corrective lens power, we need a tunable-focus lens that can operate over a range of focal distances. With robust binocular eye gaze tracking, a multitude of outward looking cameras on the headset, and a prior knowledge of the degree of user's refractive error in eye, we can determine the depth of the object of interest and adjust the focus of the external corrective lens accordingly, so as to bring the real world target into sharp focus. We note that commercial AR headsets like Microsoft Hololens already employ outward-looking cameras and trackers to analyze the ambient spatial environment, and future AR and VR HMDs are expected to have eye trackers integrated, so this work focuses on the optical correction systems.

Focus Supporting Internal Display

The internal display should be capable of rendering objects at various depths while spatially registering them to the real world, providing the depth cues either statically or dynamically. Such an internal display could be one of the following two kinds: 1) lightfield and holographic displays, which provide all depth cues statically by approximating the wavefront originating from a given point in space, or 2) varifocal display, which provides depth cues dynamically by bringing into focus one particular depth plane at any given instant. Note that providing depth cues statically ensures the correct retinal blur, whereas providing dynamic depth cues requires rendering objects away from the focus depth plane with appropriate amount of retinal blur.

The internal display type is more of a design choice, and rendering will be dependent upon the internal display technology used. For a varifocal display, a traditional rendering pipeline can be employed, with slight modifications to support computational blur and distortion correction. Lightfield and holographic display pipelines are more complex and involve multi-viewport integral imaging and point based methods with Fresnel integration. Considering the computational complexity of rendering the appropriate wavefront at the eye, generating the synthetic scene spatially registered to the real world, and the current limitations on resolution and eyebox sizes respectively, we recommend a varifocal internal display similar to the one mentioned in Dunn et al. 2017 [6] which is currently computationally less expensive, offers wider field of view and eyebox size, and a competitive resolution, all in real-time.

To summarize, AR glasses with vision correction and dynamic focus capabilities can be said to have two tasks which need to be combined into a single system:
1. actively correcting the focus of internal display; and
2. rendering virtual imagery with appropriate computational blur.

5 Implementation

Here we present our hardware prototype of the proposed display design. It includes both vision correction for the real world objects and a focus supporting internal display for virtual objects, as well as a hardware and software for setting per user calibration and controlling each subsystem.

5.1 Hardware 5.1.1 External Vision Correction

Figure 5:
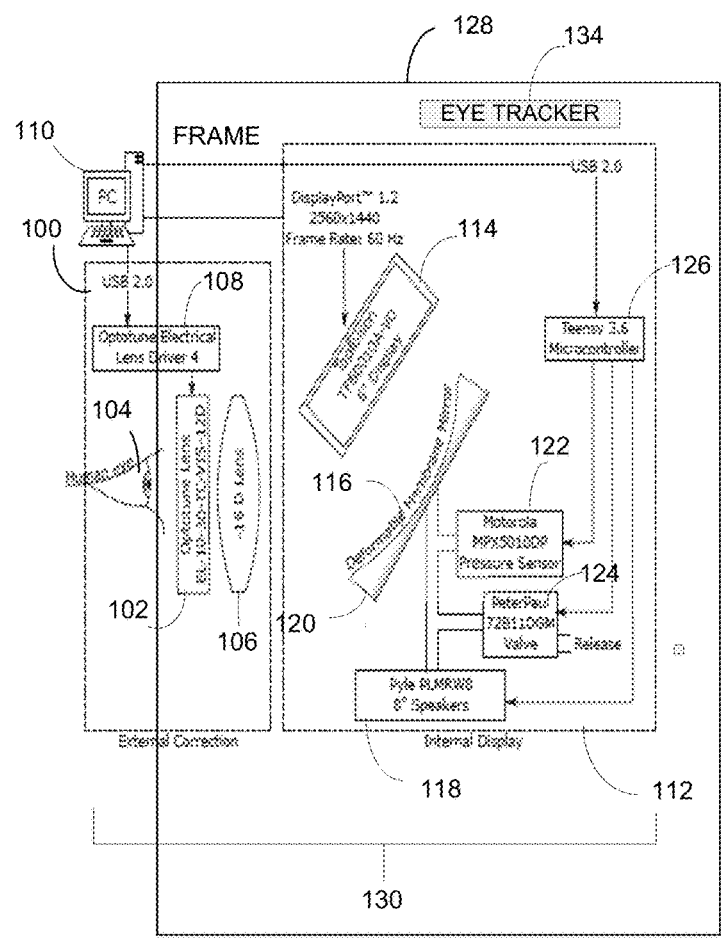
FIG. 5 is a block diagram illustrating an autofocus AR system for in focus viewing of real and virtual objects.

FIG. 5 is a block diagram illustrating an AR system for in focus viewing of real and virtual objects. In FIG. 5, the system includes an external focus correction module 100 corrects the focus of real world objects. In the illustrated example, external focus correction module 100 includes tunable lenses 102, one located in from of each of the user's eyes 104. Tunable lenses 102 are capable of enabling sharp image formation at any depth for myopic, hyperopic and presbyopic users. Our prototype uses a fast electrically tunable lens as its core, with an additional offset lens 106 enabling a total optic power range of −7.7 to +4 diopters (D). In the illustrated example, tunable lens 102 is an Optotune EL-10-30-TC-VIS-12D, which has a static to static response time under 12 ms and a focal power range of 11.7 D. A lens driver 108 drives tunable lens 102. In the illustrated example, lens driver 108 is an Optotune Electrical Lens Driver 4 controllable from a computer 110 using a custom control library written in the Python programming language. In an alternate implementation, tunable lenses 102 may be mechanically tunable, either manually by the user or automatically using a servomotor.

External focus correction module 100 is placed at 14 mm distance from the user's eye enabling a monocular 37° FoV. This placement between the user and an internal focus correction module 112 maximizes the available field of view and enables internal focus correction module 112 to present virtual images which match the external real world depths because external focus correction module 100 corrects focus for both real and virtual objects simultaneously, which simplifies the system as a whole. More particularly, internal focus correction module 112 adjusts the focal distance of virtual objects to correspond to the depths of real world objects on which the user is accommodating. External focus correction module 100 adjusts focal power of tunable lens 102 to move the real and virtual images simultaneously to a depth at which the user is capable of accommodating.

The subject matter described herein is not limited to locating external focus correction module 100 optically in front of internal focus correction module 112. In an alternate implementation, internal focus correction module 112 can be located optically in front of external focus correction module 100. In such an implementation, external focus correction module 100 may correct the focus of real world objects. Internal focus correction module 112 may independently adjust the focus of virtual objects based on the vision type of the user.

In yet another alternate implementation, a system for simultaneous in focus display of real and virtual objects may include a first tunable lens located in front of a user's eyes for adjusting the focal distance of virtual images displayed on a display, where the display comprises a non-deformable half-silvered mirror on which the virtual images can be displayed. A second tunable lens may be used to independently adjust the focus of the real objects. A combiner may be used to combine the views seen through the first and second tunable lenses.

5.1.2 Internal Display for Augmented Imagery

Internal focus correction module 112 is more refined than the varifocal display presented in Dunn et al. 2017 [6]. Internal focus correction module 112 relies on the technique of adjusting optical depth of a virtual image by dynamically adjusting the optical power of a semi-reflective membrane to match the gaze of a user. With respect to Dunn et al. 2017, we have improved the form-factor and optical quality, which led to a much smaller head-mounted volume (5.5×12.5×15.2 cm).

Internal focus correction module 112 includes a display panel 114 for displaying virtual objects to be presented to the user. In the example illustrated in FIG. 5, display panel 114 comprises a single Liquid Crystal Display (LCD) panel Topfoison TF60010A-VO 1440×2560 5.98" thin film transistor (TFT) LCD to provide imagery to both eyes. In an alternate implementation, separate display panels may be used to display virtual objects to each of the user's eyes. In addition, in other alternate implementations, display panel 114 may be a holographic display or a light field display.

To adjust to focus of virtual objects, a deformable membrane mirror 116 is located optically in front of each of a user's eyes. Deformable membrane mirror 116 serves as a display surface for virtual objects displayed by display panel 114 and is at least partially transparent to allow viewing of external real objects. The deformable membranes for each eye are manufactured using the methodology described in [6]. The current implementation does not require air compressors and pressure regulators, instead, we use a Pyle PLMRW8 8" 400 Watt 4 Ohm marine subwoofer 118 to modulate the air pressure in the membrane housing 120 for each eye. A Motorola MPX5010DP pressure sensor 122 provides feedback on the current pressure differential between ambient atmosphere and inside of membrane housing 120, thus our system no longer uses power-draining cameras for pressure control. A PeterPaul 72B11DGM 12 V DC solenoid valve 124 allows for re-pressurizing the system as needed for leak correction, which in our observation typically occurs during continuous operation about thrice an hour. All pressure modules are connected with SMC Pneumatics ¼" outer diameter (OD) tubing, one touch fittings, and T-junctions. We control the vacuum system with an Arduino Teensy 3.6 microcontroller 126, which uses a software proportion integral derivative (PID) controller to hold the membrane at the target depth based on the sensory inputs.

It should be noted that because external focus correction module 100 corrects focus of real world objects, a user is not required to wear prescription lenses. If the internal display is turned off, the system illustrated in FIG. 5 can function as auto-focus eyeglasses.

5.2 Software

All software is implemented in-house in Python and OpenGL, except for controlling the microcontroller which is done using C. We use a custom developed library for simultaneously driving the Optotune focus tunable lens and the internal display, and use OpenGL with GLFW for rendering the synthetic imagery. Our software runs on an Intel Xeon CPU W5590 @ 3.33 GHz PC with an Nvidia GeForce GTX 1080 Ti graphics processing unit (GPU) and Linux operating system.

5.3 Additional Design Details

A frame 128 may be configured to hold components 100, 102, 106, 108, and 112-128 near a user's eyes 104. In one example, frame 128 may include a component housing a form factor similar to a commercially available virtual reality (VR) or AR headset on which components 100, 102, 106, 108, and 112-128 are mounted. In another example, frame 128 may have a form factor similar to a pair of eyeglasses, and components 100, 102, 106, 108, and 112-128 may be mounted to or located within the eyeglasses frame. In a head mounted display, such as an eyeglasses frame or a headset similar to a VR headset, computer 110 may be replaced with a more compact processing platform, such as a microprocessor and associated memory.

External focus correction module 100 and internal focus correction module 112 can be considered as a dynamic vision correction module 130 for adjusting focal distances of virtual and real objects based on a vision type of the user. In one example, adjusting focal distances may be implemented differently based on a vision type of the user includes using different autofocus methods for users with different vision types. For example, for users with no visual impairments, dynamic vision correction module 130 may apply no correction to the focus of real word objects and dynamic correction to the focus of virtual objects, where dynamic correction of the focus of virtual objects means that the focus of virtual objects changes with the user's gaze or vergence distance. For users with myopic vision or near sightedness, dynamic vision correction module 130 may operate in a static mode to apply static correction to correct the focus of real world objects and dynamic correction to correct the focus of virtual objects with the focal plane offset by the correction applied to real world objects. For users with hyperopic vision or far sightedness, dynamic vision correction module 130 may operate in the static mode to apply static correction to correct the focus of real world objects and dynamic correction to correct the focus of virtual objects with the focal plane offset by the correction applied to real world objects, i.e., based on the user's vision correction prescription. For users with presbyopic vision, dynamic vision correction module 130 may apply dynamic correction to correct the focus of real world objects and static correction to correct the focus of virtual objects.

Figure 6:
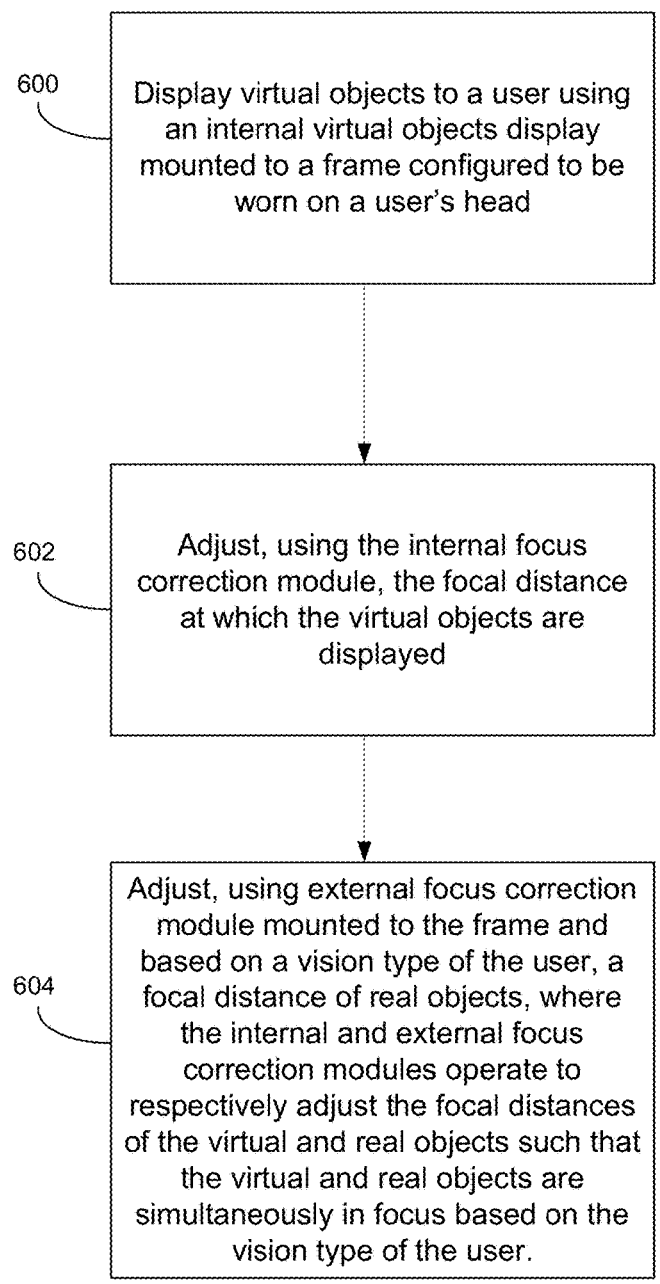
FIG. 6 is a flow chart of an exemplary process for in-focus viewing of real and virtual objects using the system of FIG. 5.

FIG. 6 illustrates an exemplary process for providing auto-focus augmented reality viewing of real and virtual objects. Referring to FIG. 6, in step 600, the method includes displaying virtual objects to a user using an internal display mounted to a frame configured to be worn on a user's head. For example internal display 114 may be mounted in or on a head mounted display frame and may display virtual objects to a user using a display screen.

In step 602, the method further includes adjusting, using the internal focus correction module, the focal distance at which the virtual objects are displayed to the user. For example, internal focus correction module 112 may include a deformable membrane mirror onto which virtual objects are projected. The membrane may deform to adjust the focal distance at which virtual objects are displayed based on the vision type of the user.

In step 604, the method further includes adjusting, using an external focus correction module mounted to the frame and based on a vision type of the user, a focal distance of real objects, where the internal and external focus correction modules operate to respectively adjust the focal distances of the virtual and real objects such that the virtual and real objects are simultaneously in focus based on the vision type of the user.

6 Discussion

In this section we provide an experimental assessment of our prototype auto-focus AR eyeglasses and discuss the capabilities and limitations of our proposed design.

6.1 Experimental Configuration

Figure 7:
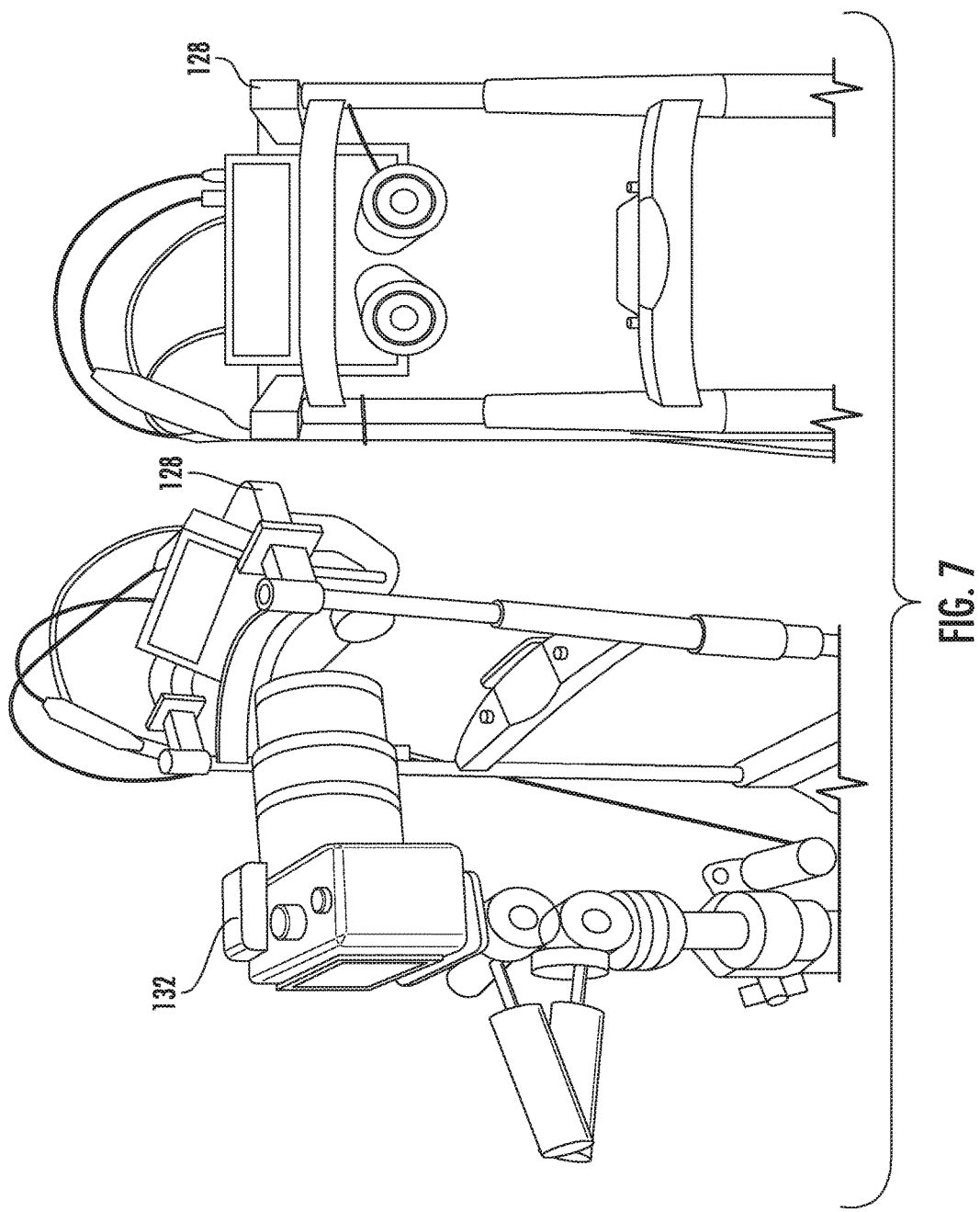
FIG. 7 is a diagram illustrating prototype hardware and testing configuration.

To test our prototype described in Section 5, a Canon Rebel T6i camera with EF 24-70 1:2.8 L USM lens was placed behind external focus correction module 100 looking through the display into the world, imitating the human eye. FIG. 7 illustrates the test configuration used. In FIG. 7, camera 132 is located behind prototype display frame 128 with camera 132 configured to approximate users with normal vision and presbyopia. Right: User side view of our prototype display consisting of vision correcting modules for external world focus adjustments, as well as deformable beam splitter membranes to drive the focus of the internal display.

The distance between the camera lens and the vision correcting module was maintained close to 22 mm—slightly more than the typical distance between the eyes and eyeglasses. Due to the slightly larger camera distance, the field of view in the captured images is worse than a user experiences. The aperture of the camera was set to f2.8. The camera setup is shown in FIG. 7. A real world scene is created by placing a postage stamp at 0.25 m, a text book at 1 m and a bicycle at a distance of 5 m from the display. A polygonal model of the Stanford bunny is used for the virtual image and is rendered on the internal display using OpenGL. Two different kinds of users are simulated—user with normal vision and user with presbyopia having only distant vision. Specific details follow.

6.2 Results for User with Normal Vision

To simulate a user with normal vision who has no loss in accommodation, the camera focus was continuously adjusted to bring various depths into focus while external focus correction module 100 was turned off. Two different scenarios were simulated 1. user wearing a conventional HMD where the virtual image depth is fixed at 1 m (i.e. at the text book)
2. user wearing a varifocal internal display where the virtual image depth was dynamically adjusted to match that of real world targets.

Figure 8:
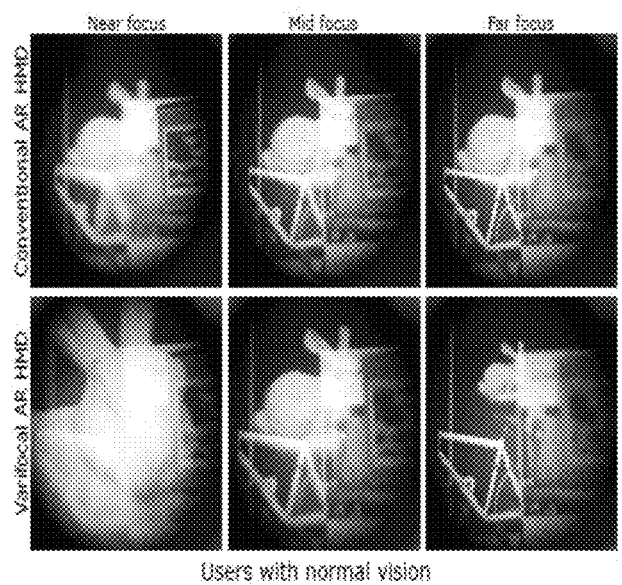
FIG. 8 illustrates images simulating view that would be seen by a user with normal vision in an AR HMD without focus correction for virtual objects (top row) and with focus correction for virtual objects (bottom row)

The results captured in both these settings are reported in FIG. 8. More particularly, FIG. 8 illustrates images that simulate views of a user with normal vision using a camera with continuously adjustable focus. A comparison between a conventional AR HMD and a varifocal AR HMD (Dunn et al. 2017) is also shown in FIG. 8. In FIG. 8, the real world objects, a postage stamp, a text book and a bicycle, are placed at near, mid and far distances of 0.25 m, 1 m and 5 m respectively. In the top row of images in FIG. 8, a conventional AR HMD is mimicked by fixing the virtual image plane at 1 m, and the scene as viewed by a user with normal vision is simulated by adjusting the focus of the camera to various real world objects. It can be seen that various real world targets at near, medium and far distances are in focus, but the virtual bunny is in focus only at mid-distance because the image plane of the virtual bunny is fixed. The bottom row of images in FIG. 8 illustrates that with a varifocal display, the virtual image depth can be dynamically set to match the depth of the real world object. Therefore, it can be seen that both the real world objects as well as the virtual bunny are in focus for all near, mid and far distances.

Conventional AR HMD

In the conventional HMD setting, it can be observed that the virtual images clearly appear blurred when the user sets focus on the near postage stamp, since the virtual image depth does not match with the real world depth. However, since the virtual image depth is set to the depth of the text book, both the bunny and the text book can be seen in focus. This shows that conventional AR HMDs are not good enough for providing comfortable viewing experience of augmented content.

Varifocal AR HMD

On the other hand, when the internal display is switched to the varifocal mode, the virtual bunny could be set to near, medium and far distances matching the depths of the real world targets. It can be noticed that the bunny and the real world targets are always in focus at all depths. The bunny is scaled appropriately for near, medium and far distances to include perspective depth.

6.3 Results for Presbyopic User with Distant Vision

Figure 9:
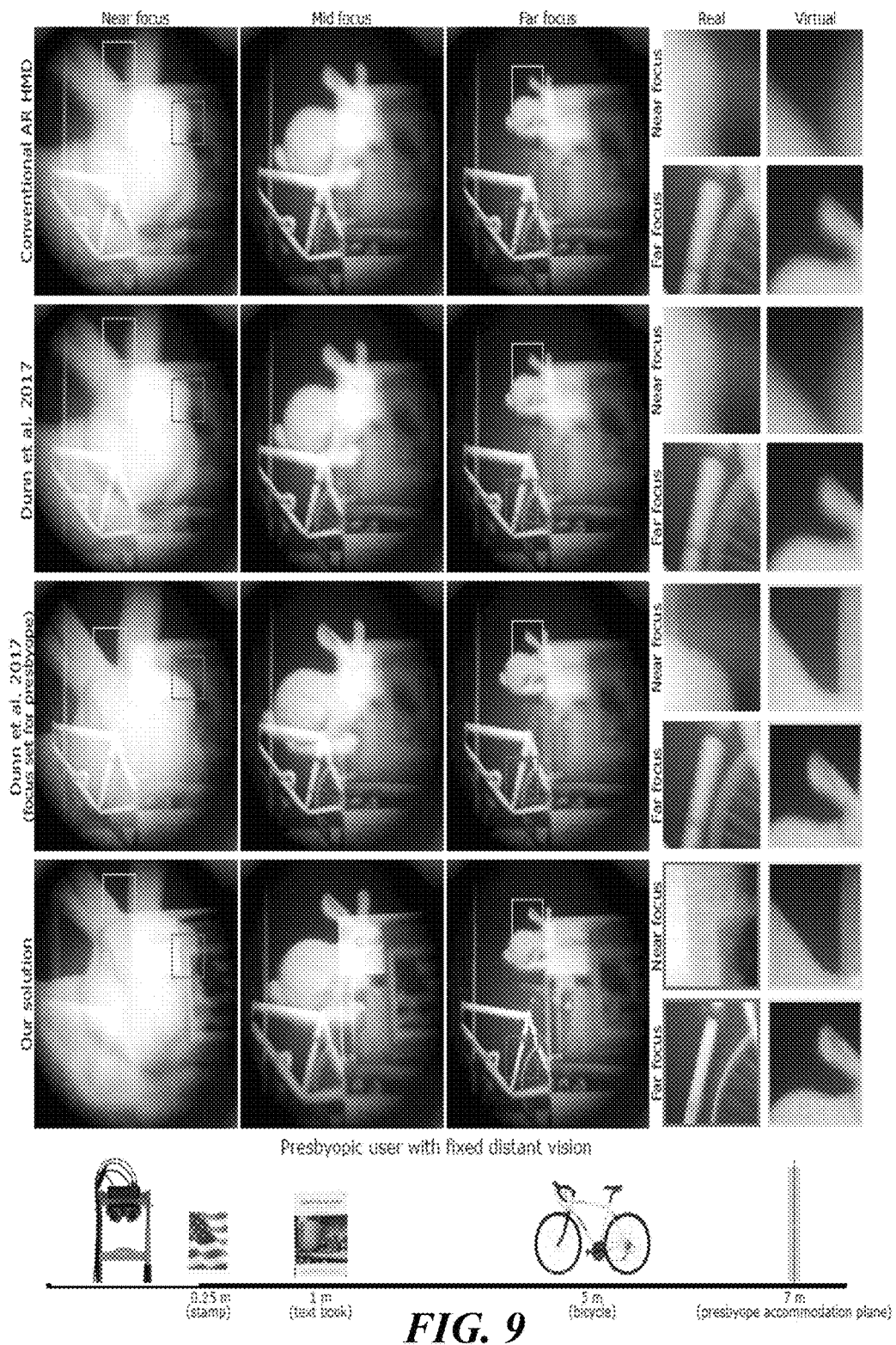
FIG. 9 illustrates images simulating views that would be seen by a presbyopic user through a conventional AR HMD without internal or external focus correction (top row), with internal but not external focus correction (second row), and with internal and external focus correction (bottom row).

To simulate a presbyopic user with distant vision, we set the camera focus fixed at a distance of 7 m to simulate a hardened lens with nearly zero accommodation. The virtual bunny is rendered with appropriate scaling for near, medium and far distances. The following four different scenarios are simulated in this experiment:

1. conventional AR HMD with no vision correction for external view and no dynamic focus adjustment for the internal display, with the focus of the virtual display set to medium distance (i.e. 1 m)
2. varifocal AR HMD, to simulate recent works on focus supporting near-eye displays, where the vision correction module is inactive but the virtual image depth can be adjusted dynamically
3. adjusted static focus internal display with the depth of the virtual image adjusted to match that of the presbyopic user accommodation (7 m in this case), but with external focus correction module 100 inactive
4. our auto-focus AR eyeglasses mode, where the focus for both the internal display and the external real world view can be independently and dynamically adjusted All results from the above scenarios are reported in FIG. 9. More particularly, in FIG. 9, the views of real and virtual imagery as seen by a presbyopic user with distant vision, with the accommodation distance fixed at 7 m is simulated by fixing the camera focus at 7 m. The real world objects are placed at near, mid and far distances. In Row 1 of FIG. 9 the virtual bunny focus is fixed to a mid distance of 1 m to simulate a conventional AR HMD. The real and virtual objects at all near, mid and far distances appear out of focus for the presbyopic user in this case. Row 2: A Varifocal AR HMD (Dunn et al. 2017) can place virtual imagery at any depth dynamically. However, due to limited accommodation in a presbyope, providing correct virtual image depth does not result in well-focused virtual images. The presbyope cannot focus on real world objects without corrective lenses for each distance range, and hence both real and virtual imagery appear out of focus. Row 3: The distance of the virtual image plane is set to the fixed distance matching the accommodation of the presbyopic user so the virtual images appear in focus whereas the real world objects all appear out of focus. Row 4: The view of both real and virtual for a presbyopic user as viewed from our prototype display. We adjust independently for the focus of both real world and the internal display so both the real world objects and the virtual bunny are in focus at all near, mid and far distances.

Conventional AR HMD

When the display is operated in conventional AR HMD mode, both real and virtual objects appear blurred as expected, since the virtual image depth is set at 1 m whereas the user focus is set to 7 m, beyond all the target distances either real or virtual.

Varifocal AR HMD

When the internal display is switched to varifocal mode the perceived image does not improve, unlike the case with previous experiment with the user having normal vision. This is because although the virtual image depths are spatially registered to the depths of the real world objects, the user's accommodation does not match the depth of the objects. And unlike users with normal vision, presbyopes have nearly zero accommodation range.

Adjusted Static Focus

However, when the focus of the internal display is adjusted to be static at the accommodation depth of the user, the virtual imagery now comes into sharp focus. This is in accordance with equation 12 discussed in section 3. However, the real world objects still appear out of focus.

Our Solution

When the vision correction module of the display is turned on, the external corrective lens is also adjusted to match the user's accommodation depth to that of the target object depth in the real world, while simultaneously adjusting the focus of the internal display to match the depth of the real world object. Therefore, it can be seen that both real and virtual are in focus at all near, medium and far distances.

These results verify that independent adjustments are needed for viewing both real and virtual for presenting well-focused images for a large pool of users. Also, with such auto-focus AR eyeglasses, the vision of presbyopes can be significantly improved with the perceived image quality being close to that of a person with 20/20 vision at all depths. We do not discuss here the experiments related to near-sighted or far-sighted users since they fall within the spectrum of users with normal vision having a large range of accommodation and users with presbyopia with nearly zero accommodation range.

Limitations

The current implementation of the prototype has certain limitations and are discussed here.

Field of View

The major limitation of our prototype is the available field of view for viewing both real and virtual simultaneously. Although the internal display for viewing virtual imagery provides a field of view of about 75° both horizontally and vertically, the small aperture size of 10 mm of the tunable focus lens limits the overall field of view to 37°. However, we would like to point that the recent research on large aperture tunable focus lenses discussed in section 2.2 which is promising for an increased FoV in the near future.

Eye Tracking

The current prototype does not integrate eye tracking due to hardware constraints—employing an eye tracker required users to be further away from the vision correction module, which decreased the usable field of view. However, we plan to integrate eye tracking in the future version of our prototype with an increased aperture and FoV. Thus, referring back to FIG. 5, an eye tracker 134 may be used to track the vergence distance and also the amount and type of vision correction needed for each user. In one exemplary implementation, eye tracker 134 may include a Shack-Hartmann wavefront sensor for characterizing wavefront error in the user's eyes. The wavefront error can be used to measure the accommodation depth and determine the vision type of each user.

7 Conclusion and Future Work

We have demonstrated a proof of concept design for auto-focus augmented reality eyeglasses that can let a wide range of users appropriately focus on both real and virtual content simultaneously, a capability never before achieved to the best of our knowledge. We employ a deformable beamsplitter membrane varifocal display for presenting virtual imagery at spatially registered depths, and a tunable focus lens for dynamic prescription correction, when needed.

Our early prototype demonstrates preliminary capabilities to display both rendered and real content in sharp focus for users with and without any refractive errors. However, the current system does not implement eye racking and is limited by the field of view. In future work, we plan to integrate eye tracking and outward looking cameras to make the system completely automatic, and increase the field of view by employing wider aperture tunable focus lenses.

We are excited by the possibility of future AR displays employing dynamic vision correction alongside focus supporting internal displays, enabling the promise of 20/20 vision at all distances, for all users, for both real world and virtual imagery.

The disclosure of each of the following references is hereby incorporated herein by reference in its entirety.

REFERENCES

[1] K. R. Aggarwala, E. S. Kruger, S. Mathews, and P. B. Kruger. Spectral bandwidth and ocular accommodation. JOSA A, 12(3):450-455, 1995.

[2] K. Akeley, S. J. Watt, A. R. Girshick, and M. S. Banks. A stereo display prototype with multiple focal distances. In ACM transactions on graphics (TOG), vol. 23, pp. 804-813. ACM, 2004.

[3] K. Aks,it, W. Lopes, J. Kim, P. Shirley, and D. Luebke. Near-eye varifocal augmented reality display using see-through screens. ACM Transactions on Graphics (TOG), 36(6):189, 2017.

[4] S. A. Cholewiak, G. D. Love, P. P. Srinivasan, R. Ng, and M. S. Banks. Chromablur: rendering chromatic eye aberration improves accommodation and realism. ACM transactions on graphics, 36(6):210, 2017.

[5] F. C. Donders and W. D. Moore. On the anomalies of accommodation and refraction of the eye: With a preliminary essay on physiological dioptrics, vol. 22. New Sydenham Society, 1864.

[6] D. Dunn, C. Tippets, K. Torell, P. Kellnhofer, K. Aks,it, P. Didyk, K. Myszkowski, D. Luebke, and H. Fuchs. Wide field of view varifocal near-eye display using see-through deformable membrane mirrors. IEEE Transactions on Visualization and Computer Graphics, 23(4):1322-1331, 2017.

[7] E. F. Fincham and J. Walton. The reciprocal actions of accommodation and convergence. The Journal of physiology, 137(3):488-508, 1957.

[8] G. A. Fry. Further experiments on the accommodation-convergence relationship*. Optometry & Vision Science, 16(9):325-336, 1939.

[9] N. Hasan, A. Banerjee, H. Kim, and C. H. Mastrangelo. Tunable-focus lens for adaptive eyeglasses. Optics Express, 25(2):1221-1233, 2017.

[10] N. Hasan, H. Kim, and C. H. Mastrangelo. Large aperture tunablefocus liquid lens using shape memory alloy spring. Optics express, 24(12):13334-13342, 2016.

[11] D. M. Hoffman, A. R. Girshick, K. Akeley, and M. S. Banks. Vergence-accommodation conflicts hinder visual performance and cause visual fatigue. Journal of vision, 8(3):33-33, 2008.

[12] X. Hu and H. Hua. High-resolution optical see-through multi-focalplane head-mounted display using freeform optics. Optics express, 22(11):13896-13903, 2014.

[13] H. Hua and B. Javidi. A 3d integral imaging optical see-through head-mounted display. Optics express, 22(11):13484-13491, 2014. [14] F.-C. Huang, K. Chen, and G. Wetzstein. The light field stereoscope: immersive computer graphics via factored near-eye light field displays with focus cues. ACM Transactions on Graphics (TOG), 34(4):60, 2015.

[15] F.-C. Huang, G. Wetzstein, B. A. Barsky, and R. Raskar. Eyeglassesfree display: towards correcting visual aberrations with computational light field displays. ACM Transactions on Graphics (TOG), 33(4):59, 2014.

[16] R. Konrad, E. A. Cooper, and G. Wetzstein. Novel optical configurations for virtual reality: Evaluating user preference and performance with focus-tunable and monovision near-eye displays. In Proceedings of the 2016 CHI Conference on Human Factors in Computing Systems, pp. 1211-1220. ACM, 2016.

[17] R. Konrad, N. Padmanaban, K. Molner, E. A. Cooper, and G. Wetzstein. Accommodation-invariant computational near-eye displays. ACM Transactions on Graphics (TOG), 36(4):88, 2017.

[18] G.-A. Koulieris, B. Bui, M. Banks, and G. Drettakis. Accommodation and comfort in head-mounted displays. ACM Transactions on Graphics, 36(4):11, 2017.

[19] P. B. Kruger, S. Mathews, K. R. Aggarwala, and N. Sanchez. Chromatic aberration and ocular focus: Fincham revisited. Vision Research, 33(10):1397-1411, 1993.

[20] M. Lambooij, M. Fortuin, I. Heynderickx, and W. Usselsteijn. Visual discomfort and visual fatigue of stereoscopic displays: A review. Journal of Imaging Science and Technology, 53(3):30201-1, 2009.

[21] D. Lanman and D. Luebke. Near-eye light field displays. ACM Transactions on Graphics (TOG), 32(6):220, 2013.

[22] Y.-H. Lin and H.-S. Chen. Electrically tunable-focusing and polarizerfree liquid crystal lenses for ophthalmic applications. Optics express, 21(8):9428-9436, 2013.

[23] G. Lippmann. Reversible events photos integrals. Academic Accounts-Academic, 146, 1908.

[24] M. Lombardo and G. Lombardo. Wave aberration of human eyes and new descriptors of image optical quality and visual performance. Journal of cataract & refractive surgery, 36(2):313-331, 2010.

[25] A. Maimone and H. Fuchs. Computational augmented reality eyeglasses. In Mixed and Augmented Reality (ISMAR), 2013 IEEE International Symposium on, pp. 29-38. IEEE, 2013.

[26] A. Maimone, A. Georgiou, and J. S. Kollin. Holographic near-eye displays for virtual and augmented reality. ACM Transactions on Graphics (TOG), 36(4):85, 2017.

[27] A. Maimone, D. Lanman, K. Rathinavel, K. Keller, D. Luebke, and H. Fuchs. Pinlight displays: wide field of view augmented reality eyeglasses using defocused point light sources. In ACM SIGGRAPH 2014 Emerging Technologies, p. 20. ACM, 2014.

[28] N. Matsuda, A. Fix, and D. Lanman. Focal surface displays. ACM Transactions on Graphics (TOG), 36(4): 86, 2017.

[29] S. Orts-Escolano, C. Rhemann, S. Fanello, W. Chang, A. Kowdle, Y. Degtyarev, D. Kim, P. L. Davidson, S. Khamis, M. Dou, V. Tankovich, C. Loop, Q. Cai, P. A. Chou, S. Mennicken, J. Valentin, Pradeep, S. Wang, S. B. Kang, P. Kohli, Y. Lutchyn, C. Keskin, and S. Izadi. Holoportation: Virtual 3d teleportation in real-time. In Proceedings of the 29th Annual Symposium on User Interface Software and Technology, UIST '16, pp. 741-754. ACM, New York, N.Y., USA, 2016. doi: 10.1145/2984511.2984517

[30] N. Padmanaban, R. Konrad, T. Stramer, E. A. Cooper, and G. Wetzstein. Optimizing virtual reality for all users through gaze-contingent and adaptive focus displays. Proceedings of the National Academy of Sciences, p. 201617251, 2017.

[31] A. S. Percival. The relation of convergence to accommodation and its practical bearing. Ophthal. Rev., 11:313-328, 1892.

[32] S. F. Ray. Applied photographic optics: Lenses and optical systems for photography, film, video, electronic and digital imaging. Focal Press, 2002.

[33] C. M. Schor. A dynamic model of cross-coupling between accommodation and convergence: simulations of step and frequency responses. Optometry & Vision Science, 69(4):258-269, 1992.

[34] C. Sheard. The prescription of prisms. American Journal of Optometry, 11(10):364-378, 1934.

[35] L. Shi, F.-C. Huang, W. Lopes, W. Matusik, and D. Luebke. Near-eye light field holographic rendering with spherical waves for wide field of view interactive 3d computer graphics. ACM Transactions on Graphics (TOG), 2017.

[36] T. Shibata, J. Kim, D. M. Hoffman, and M. S. Banks. The zone of comfort: Predicting visual discomfort with stereo displays. Journal of vision, 11(8):11-11, 2011.

[37] K. Wei, N. W. Domicone, and Y. Zhao. Electroactive liquid lens driven by an annular membrane. Optics letters, 39(5):1318-1321, 2014.

[38] K. Wei, H. Huang, Q. Wang, and Y. Zhao. Focus-tunable liquid lens with an aspherical membrane for improved central and peripheral resolutions at high diopters. Optics express, 24(4):3929-3939, 2016.

What is claimed is:

1. A system for providing auto-focus augmented reality viewing of real and virtual objects, the system comprising:
   a frame for holding augmented reality viewing components on a user's head and optically in front of the user's eyes, the augmented reality viewing components including:
   an internal virtual objects display for displaying virtual objects;
   an internal focus correction module for adjusting a focal distance at which the virtual objects are displayed based on a vision type of a user and configurable to adjust the focal distance of the virtual objects differently for different user vision types; and an external focus correction module for adjusting focal distance of real objects based on the vision type of the user and configurable to adjust the focal distance of the real objects differently based on the different user vision types, wherein the internal and external focus correction modules operate to respectively adjust the focal distances of the virtual and real objects such that the virtual and real objects are simultaneously in focus based on the vision type of the user, wherein the external focus correction module includes a tunable lens through which the real and virtual objects are viewable and the internal focus correction module includes a deformable membrane mirror that reflects the virtual objects through the tunable lens and which is at least partially transparent to allow the user to view the real objects through the deformable membrane mirror, wherein, for a user having a hyperopic vision type, the external focus correction module operates in a static mode to apply a fixed positive dioptric lens power to statically shift the focal distances of the real objects and the internal focus correction module operates in a dynamic mode to change the focal distances of the virtual objects as the user accommodates to different real world distances as shifted by the external focus correction module, and wherein, for a user having a presbyopic vision type, the external focus correction module operates in a dynamic mode to change the focal distances of the real objects based on depths of the real objects and the internal focus correction module operates in a static mode to change the focal distances of the virtual objects to a focal distance at which the user is capable of accommodating.

2. The system of claim 1 wherein the external focus correction module is located optically in front of the internal focus correction module.

3. The system of claim 1 wherein the internal focus correction module is located optically in front of the external focus correction module.

4. The system of claim 1 wherein the internal focus correction module comprises a first tunable lens for adjusting the focal distance of the virtual objects and the external focus correction module comprises a second tunable lens for adjusting the focal distance of the real objects.

5. The system of claim 1 wherein the tunable lens is controllable to change its focal power.

6. The system of claim 5 wherein the tunable lens is programmatically controllable to correct the focal distance of the real objects based on the different user vision types.

7. The system of claim 5 wherein the tunable lens comprises an electrically or mechanically tunable lens.

8. The system of claim 6 comprising an eye tracker for generating measurements usable to determine a vision type of the user, wherein the tunable lens is controllable to adjust the focal distance of the virtual objects according to the vision type determined from the measurements output from the eye tracker.

9. The system of claim 8 wherein the eye tracker comprises a wavefront sensor.

10. The system of claim 1 wherein the deformable membrane mirror serves as a display surface for the virtual objects displayed by the internal virtual objects display, that changes its shape to adjust the focal distance of the virtual objects.

11. The system of claim 1 wherein, for a user having a normal vision type, the external focus correction module does not correct the focus of the real objects and the internal focus correction module operates in dynamic mode to change the focal distances of the virtual objects as the user accommodates to different real world distances.

12. The system of claim 1 wherein, for a user having a myopic vision type, the external focus correction module operates in a static mode to apply a fixed negative dioptric lens power to statically shift the focal distances of the real objects and the internal focus correction module operates in a dynamic mode to change the focal distances of the virtual objects as the user accommodates to different real world distances as shifted by the external focus correction module.

13. The system of claim 1 wherein the internal virtual objects display comprises a holographic display.

14. The system of claim 1 wherein the internal virtual objects display comprises a light field display.

15. A method for providing auto-focus augmented reality viewing of real and virtual objects, the method comprising:

displaying virtual objects on an internal display mounted to a frame for holding augmented reality viewing components on a user's head;

adjusting, using an internal focus correction module that is configurable to adjust focal distances of the virtual objects differently for different user vision types, a focal distance at which the virtual objects are displayed based on a vision type of the user adjusting, using an external focus correction module that is configurable to adjust focal distances of the real object based on the different user vision types, a focal distance of real objects based on the vision type of the user; and wherein the internal and external focus correction modules operate to respectively adjust the focal distances of the virtual and real objects such that the virtual and real objects are simultaneously in focus based on the vision type of the user, wherein the external focus correction module includes a tunable lens through which the real and virtual objects are viewable and the internal focus correction module includes a deformable membrane mirror that reflects the virtual objects through the tunable lens and which is at least partially transparent to allow the user to view the real objects through the deformable membrane mirror, wherein, for a user having a hyperopic vision type, the external focus correction module operates in a static mode to apply a fixed positive dioptric lens power to statically shift the focal distances of the real objects and the internal focus correction module operates in a dynamic mode to change the focal distances of the virtual objects as the user accommodates to different real world distances as shifted by the external focus correction module, and wherein, for a user having a presbyopic vision type, the external focus correction module operates in a dynamic mode to change the focal distances of the real objects based on depths of the real objects and the internal focus correction module operates in a static mode to change the focal distances of the virtual objects to a focal distance at which the user is capable of accommodating.

16. The method of claim 15 comprising generating, using an eye tracker, measurements usable to determine the vision type of the user.

17. The method of claim 15 wherein, for a user having a normal vision type, the external focus correction module does not correct the focus of the real objects and the internal focus correction module operates in dynamic mode to change the focal distances of the virtual objects as the user accommodates to different real world distances.

18. The method of claim 15 wherein, for a user having a myopic vision type, the external focus correction module operates in a static mode to apply a fixed negative dioptric lens power to statically shift the focal distances of the real objects and the internal focus correction module operates in a dynamic mode to change the focal distances of the virtual objects as the user accommodates to different real world distances as shifted by the external focus correction module.

* * * * *